United States Patent
Ohkawa

(10) Patent No.: US 7,069,460 B2
(45) Date of Patent: Jun. 27, 2006

(54) METHOD AND APPARATUS FOR IMAGE PROCESSING WITH AN EFFECTIVE LINE NOISE CORRECTION

(75) Inventor: Satoshi Ohkawa, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 1023 days.

(21) Appl. No.: 10/097,741

(22) Filed: Mar. 15, 2002

(65) Prior Publication Data

US 2004/0013321 A1   Jan. 22, 2004

(30) Foreign Application Priority Data

Mar. 16, 2001   (JP) .............................. 2001-075324

(51) Int. Cl.
*G06F 1/04*   (2006.01)

(52) U.S. Cl. ...................... 713/500; 713/501; 713/502; 713/503

(58) Field of Classification Search ................ 713/500, 713/501, 502, 503
See application file for complete search history.

(56) References Cited

U.S. PATENT DOCUMENTS 6,493,830 B1 * 12/2002 Kamei ........................ 713/501
6,525,842 B1 * 2/2003 Nakajima et al. ........... 358/409

FOREIGN PATENT DOCUMENTS

JP   2000-22959   1/2000
JP   2000-138805  5/2000

* cited by examiner

*Primary Examiner*—Thomas C. Lee
*Assistant Examiner*—Erin Dogan
(74) *Attorney, Agent, or Firm*—Oblon, Spivak, McClelland, Maier & Neustadt, P.C.

(57) ABSTRACT

An image processing apparatus including an image processing circuit, a frequency dispersion circuit, and a timing signal generator. The image processing circuit processes an image signal, and the frequency dispersion circuit performs frequency dispersion relative to a reference clock signal by continuously modulating an oscillating frequency of the reference clock signal in a predetermined modulation cycle and to generate a frequency dispersion clock signal. The timing signal generator generates a timing signal that controls an operation of the image processing circuit using the frequency dispersion clock signal, in synchronism with the predetermined modulation cycle used for the frequency dispersion.

20 Claims, 5 Drawing Sheets

METHOD AND APPARATUS FOR IMAGE PROCESSING WITH AN EFFECTIVE LINE NOISE CORRECTION

BACKGROUND OF THE INVENTION

1. Field of the Invention

The present invention relates to a method and apparatus for image processing, and more particularly to a method and apparatus that effectively corrects a line noise produced due to a relatively high-speed clock signal.

2. Discussion of the Background

Image processing is an important part of image forming apparatuses such as copying machines, facsimile machine, etc., but suffers from a high frequency radiation noise, particularly in a place where image data is input with a line image sensor such as a CCD (charge-coupled device). This problem is due to an application of a high-speed clock signal used to control image processing.

Frequency dispersion is one attempt to avoid the above-mentioned problem. Frequency dispersion is a technique for continuously modulating an oscillating frequency of a clock signal in a predetermined cycle so as to prevent high frequency noise from occurring at a specific frequency.

However, using the above-mentioned technique, another problem that doesn't appear in a digital signal stream occurs in an analog signal stream. In particular, when a CCD line sensor is used, a frequency dispersion cycle is not easily synchronized with an operation cycle of the CCD line sensor. Further, the CCD line sensor is driven by a clock signal that is frequency-dispersed. Therefore, an output signal waveform from the CCD line sensor is inevitably effected by such frequency-dispersed clock signal. Also, sampling positions of the CCD line sensor may be effected. Consequently, the CCD line sensor responses to the frequency dispersion cycle in a way that an output image signal includes noise asynchronous to a reference signal of a line scanning operation. As a result, this noise causes critical black lines in an image.

Two attempts have been conducted to solve the above-mentioned noise problem. A first method is described in Japanese unexamined patent publication No. 2000-138805, in which the cycle of the frequency dispersion is reset by a main scanning synchronous signal of the CCD line sensor in each scanning operation. This technique attempts to synchronize the noise with the reference clock signal of the scanning operation to avoid variable noises and to stabilize an appearance of the noise in an image, thereby improving an appearance of the image. In this method, however, the dispersion cycle is provided with an asynchronous reset signal and therefore a reduction of the radiation noise level cannot be stably maintained.

A second method is described in Japanese unexamined patent publication No. 2000-22959, in which noise elements in an image signal for one line are previously obtained and the image data is corrected for noises with reference to the previously obtained noise elements. This method, however, requires a considerable increase in a memory capacity.

SUMMARY OF THE INVENTION

Accordingly, an object of the present invention is to solve the above-noted and other problems.

To achieve these and other objects, the present invention provides a novel image processing apparatus including an image processing circuit configured to process an image signal as image reproduction data, in which the image signal is read by a line image sensor. Also included is a frequency dispersion circuit configured to perform frequency dispersion relative to a reference clock signal by continuously modulating an oscillating frequency of the reference clock signal in a predetermined modulation cycle and to generate a frequency dispersion clock signal, and a timing signal generator configured to generate a timing signal that controls an operation of the image processing circuit using the frequency dispersion clock signal generated by the frequency dispersion circuit. The timing signal generates generating the timing signal in synchronism with the predetermined modulation cycle used for the frequency dispersion relative to the reference clock signal.

The present invention also provides a novel image processing apparatus including the above-mentioned image processing circuit, frequency dispersion circuit in addition to a timing signal generator configured to generate a timing signal that controls an operation of said image processing circuit using the frequency dispersion clock signal generated by said frequency dispersion circuit. Also included is a noise correction circuit configured to previously obtain correction data for one dispersion cycle, to store the correction data, and to correct for a noise produced relative to an image due to the timing signal using the frequency dispersion clock signal in the predetermined modulation cycle of the frequency dispersion with reference to the stored correction data. The present invention also provides a novel image processing method.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
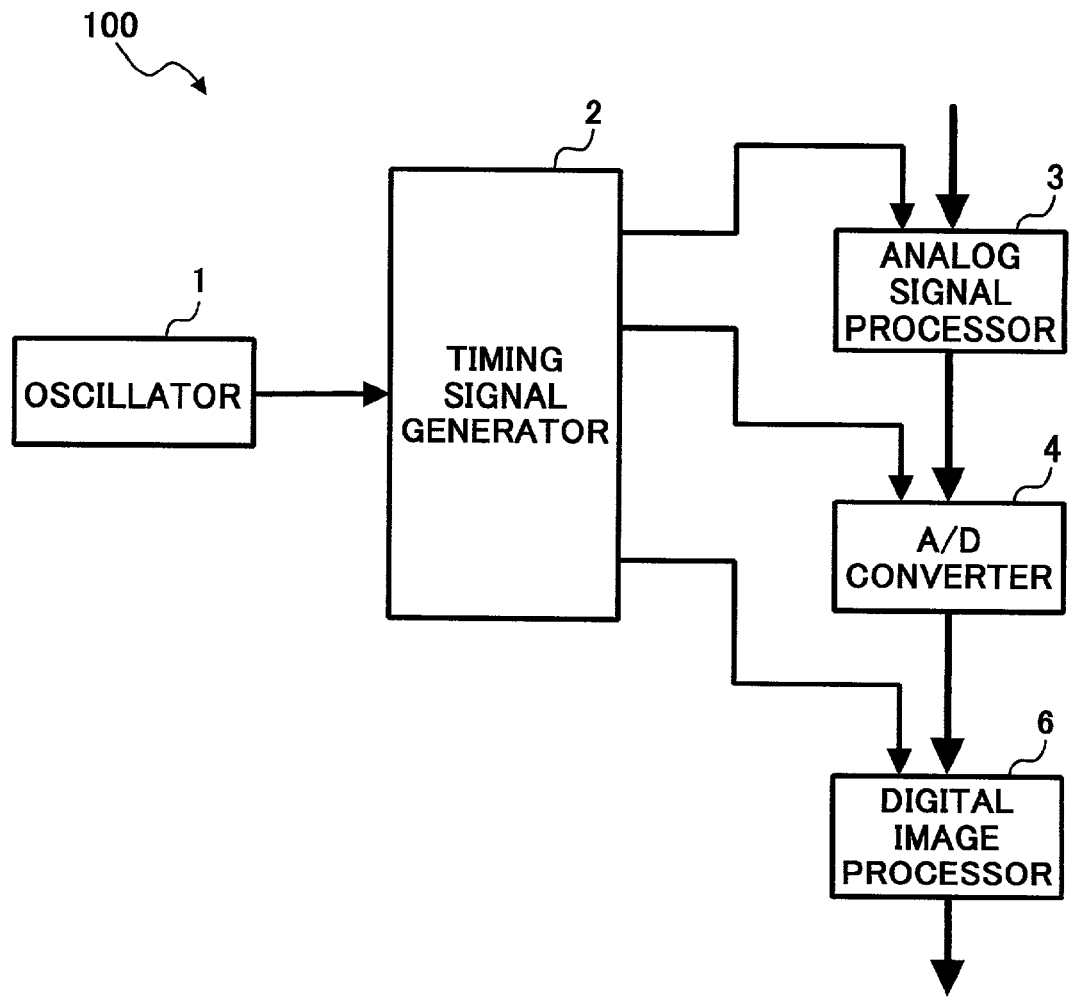
FIG. 1 is a schematic diagram of an image processing apparatus according to a preferred embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, a description is made for an image forming apparatus 100 according to a preferred embodiment of the present invention.

FIG. 1 is a block diagram of the image forming apparatus 100 which includes an oscillator 1, a timing signal generator 2, an analog signal processor 3, an A/D (analog-to-digital) converter 4, and a digital image processor 6. The oscillator 1 for generating a reference clock signal CLK is capable of producing a high-precision clock signal (e.g., 100 PPM, 50 PPM, etc.). The timing signal generator 2 generates timing signals based on the clock signal CLK sent from the oscillator 1.

With the timing signal sent from the timing signal generator 2, the analog signal processor 3 processes analog image signals input with a scanner (not shown) using a CCD (charge-coupled device), for example. The A/D converter 4 converts an analog image signal into a digital image signal based on the timing signal generated by the timing signal generator 2. The digital image processor 6 processes and outputs the digital image signal based on the timing signal generated by the timing signal generator 2.

Figure 2:
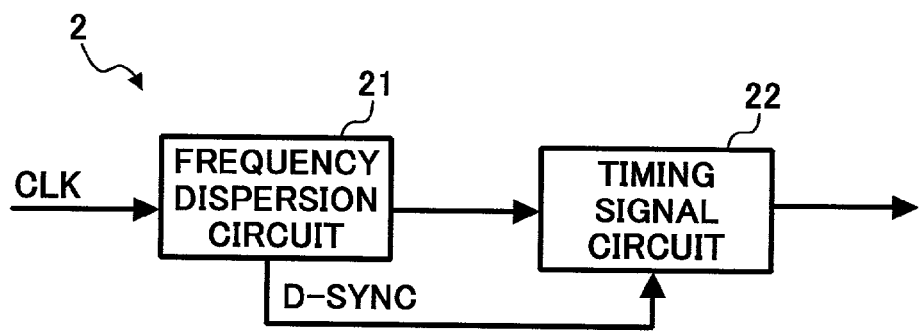
FIG. 2 is a schematic block diagram of a timing signal generator included in the image processing apparatus of FIG. 1.

FIG. 2 is a block diagram of the timing signal generator 2 of FIG. 1. As shown in FIG. 2, the timing signal generator 2 includes a frequency dispersion circuit 21 and a timing signal circuit 22. The frequency dispersion circuit 21 receives the reference clock signal CLK from the oscillator 1 and performs frequency dispersion by oscillating the clock signal CLK by slowly varying it. The resultant output from the frequency dispersion circuit 21 is the clock signal CLK in a state of periodically modulated oscillation.

Figure 3:
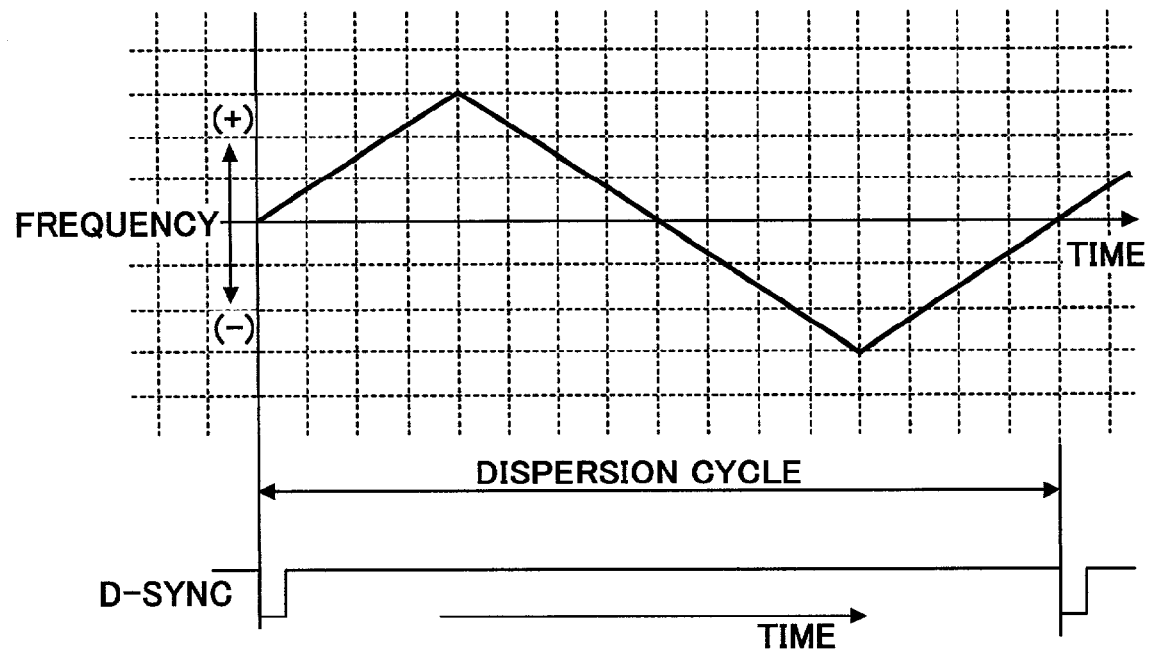
FIG. 3 is a graph linked with a time chart for explaining an exemplary modulation pattern used for frequency dispersion relative to a reference clock signal.

One exemplary pattern of frequency dispersion with a frequency modulation is shown in FIG. 3. The pattern includes a modulation cycle having a predetermined variation width, e.g., ±0.5%, ±1.0%, etc., from the center frequency of the clock signal CLK within a range that the frequency of the clock signal CLK is smoothly changed in the same pattern in both plus and minus directions. Note, a variation in the plus direction shortens the modulation cycle and a variation in the minus direction lengthens the modulation cycle. The frequency dispersion circuit 21 controls the oscillating frequency by repeating the modulation cycle with the constant dispersion cycle according to this pattern.

The frequency dispersion circuit 21 also outputs a dispersion cycle signal D-SYNC to the timing signal circuit 22. The dispersion cycle signal D-SYNC is a timing signal representing a modulation cycle used for the frequency modulation by the frequency dispersion circuit 21. When the modulation cycle for the frequency dispersion is set as shown in FIG. 3, for example, the frequency dispersion circuit 21 generates the dispersion cycle signal D-SYNC at a mid point of a frequency variation wave, as shown in FIG. 3, in each dispersion cycle. Although it is preferable the dispersion cycle signal D-SYNC is provided at one of a mid point (as shown in FIG. 3), a top point, and a bottom point of the frequency variation wave, other timings may be used.

Further, the timing signal circuit 22 generates the timing signals based on the above-described frequency-modulated clock signals output from the frequency dispersion circuit 21. That is, each component of the image forming apparatus 100 uses the timing signals generated based on the frequency-dispersed clock signals and are synchronized with the dispersion cycle signal D-SYNC. Thereby, the image forming apparatus 100 reduces a radiation noise throughout the entire system.

A more specific description of the timing signals generated by the timing signal circuit 22 is provided below. As described above, the first background method proposes a countermeasures against noise produced in the image data produced as side effects of the frequency dispersion clock signals, but it cannot stably maintain a radiation noise reduction effect because a reset signal is asynchronously input to the dispersion cycle.

In the timing signal generator 2, the line cycle is synchronized with the dispersion cycle. Consequently, the timing signal generator 2 always maintains the dispersion cycle and thereby lowers a level of the radiation noise in a stable manner. Accordingly, the timing signal generator 2 eliminates the variations of the noise produced in the image due to the side effects of the frequency dispersion clock signals. This results in the noise in the image being unobtrusive and the appearance of the image is enhanced.

Figure 4:
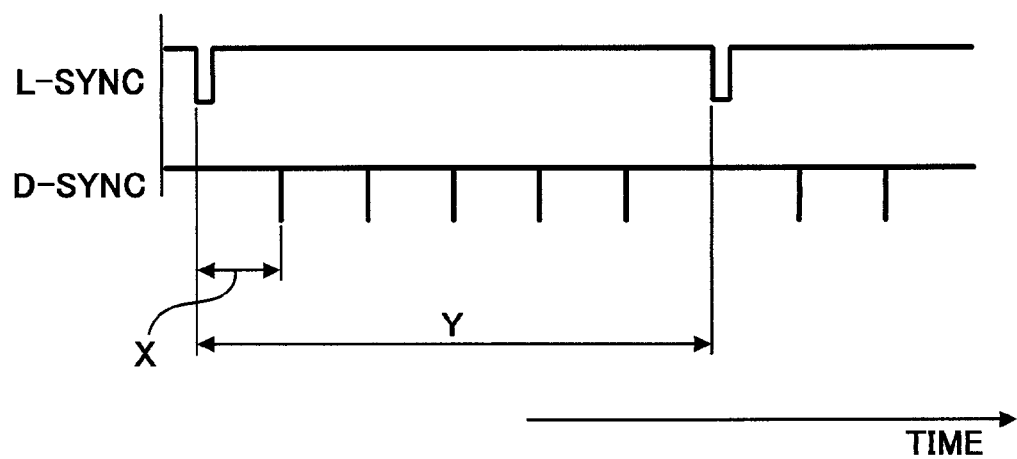
FIG. 4 is a time chart for explaining a relationship between a dispersion cycle signal and a line cycle signal.

Turning now to FIG. 4, which shows a relationship between the dispersion cycle signal D-SYNC and a line synchronous signal L-SYNC when the dispersion cycle is synchronized with a line cycle. Further, the line synchronous signal L-SYNC is a signal generated in each line of the scanning operation performed by the CCD sensor of the scanner in the main direction. In FIG. 4, a cycle of the dispersion cycle signal D-SYNC is indicated by a letter X and a cycle of the line synchronous signal L-SYNC is indicated by a letter Y. As shown in FIG. 4, the line synchronous signal L-SYNC is synchronized with the dispersion cycle signal D-SYNC output from the frequency dispersion circuit 21. With this synchronization, a relatively small amount of a drift of the modulation cycle can be corrected, which is produced when using frequency dispersion.

This synchronization is necessary because the line synchronous signal L-SYNC is produced in every main scanning line scanned by the CCD sensor and it is desired to be a produced in a constant cycle so the CCD sensor of the scanner moves in a sub-scanning direction at a constant speed. However, both of the dispersion cycle X of the frequency dispersion circuit 21 represented by the dispersion cycle signal D-SYNC, and the line cycle Y are much larger than a clock cycle of the pixels.

In addition, the length of time between the dispersion cycle X and the line cycle Y is relatively long. Therefore, if the dispersion cycle D-SYNC is simply synchronized with the line cycle L-SYNC, the number of the reference clock signals in each line may largely vary. Consequently, scanning in the sub-scanning direction is not in proper timing in the reading operation by the CCD sensor of the scanner moving at a constant speed. As a result, problematic variations of the noise in the image is produced.

To avoid the above-mentioned problem, the synchronization relationship between the dispersion cycle X and the line cycle Y is set to satisfy the following equation:

$$Y = aX. \tag{1}$$

That is, the line cycle Y is approximately equal to a value of the dispersion cycle X multiplied by "a" where "a" is an integer. With this relationship, the line cycle signal L-SYNC can be synchronized with the dispersion cycle signal D-SYNC without a problematic change in the length of the line cycle L-SYNC. Further, equation (1) is an approximate equation because the variations of the line cycle Y can be any value within a range of variations inherent to the image forming apparatus.

Figure 5:
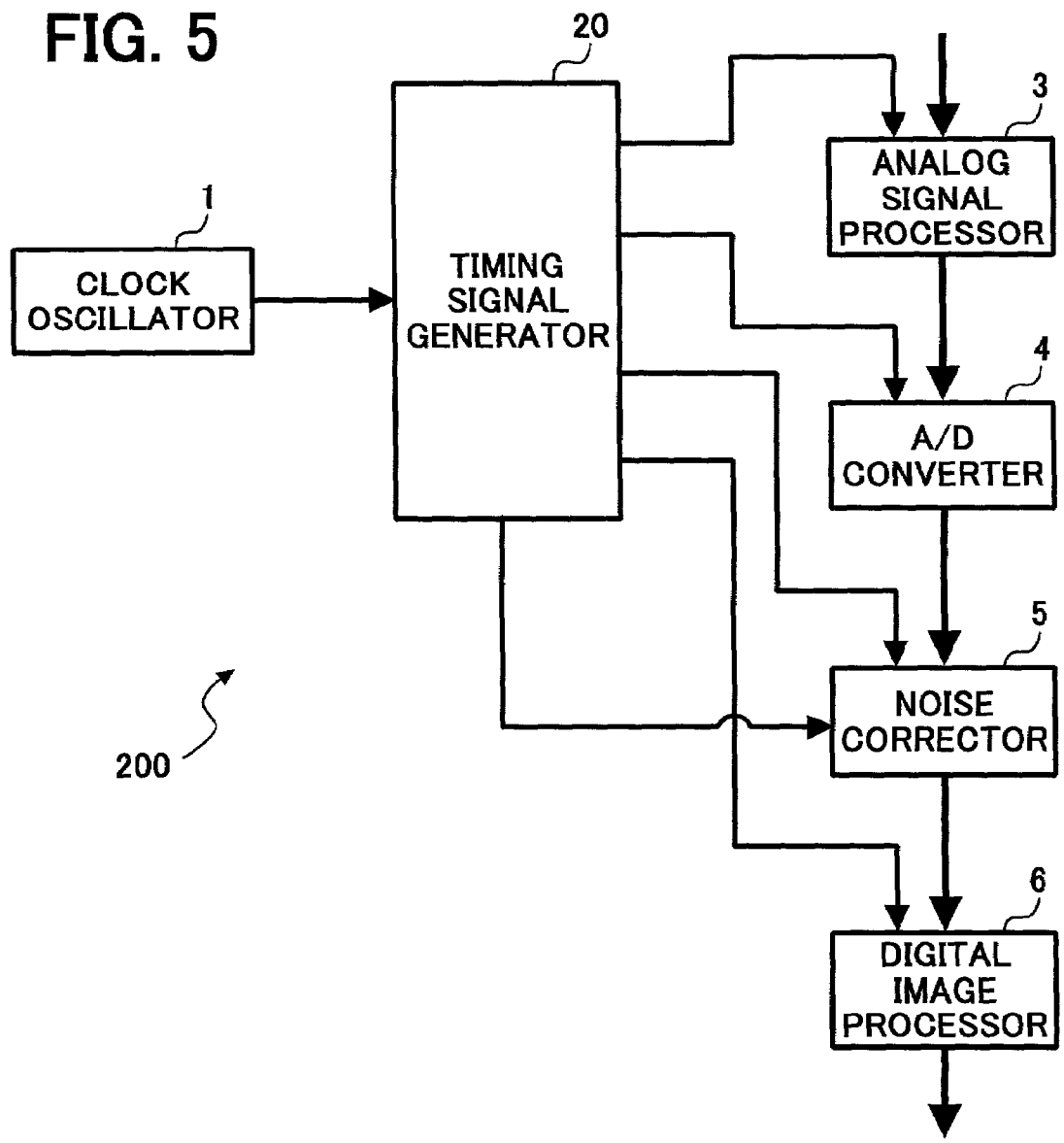
FIG. 5 is a schematic diagram of an image processing apparatus according to another preferred embodiment of the present invention.

Next, an image forming apparatus 200 according to another preferred embodiment of the present invention is explained with reference to FIG. 5. The image forming apparatus 200 of FIG. 5 is also capable of correcting and eliminating noise produced in the image due to the side effects of the frequency-dispersed clock signals. Further, the image forming apparatus 200 of FIG. 5 is similar to the image forming apparatus 100 of FIG. 1, except for a timing signal generator 20 and a noise corrector 5.

Figure 6:
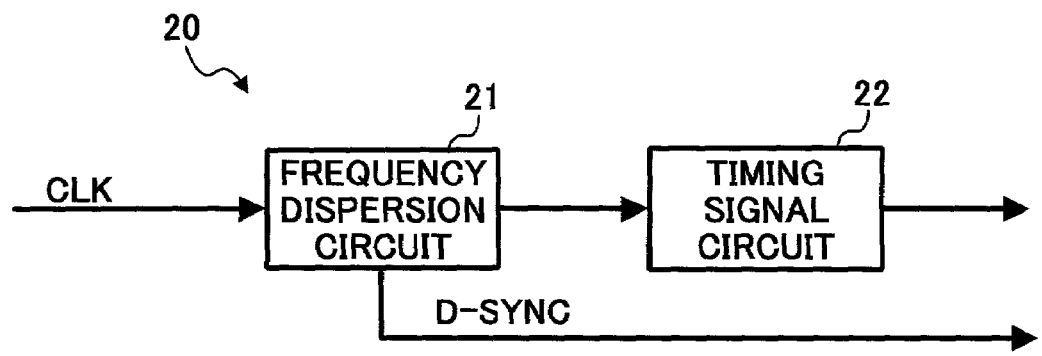
FIG. 6 is a schematic block diagram of a timing signal generator included in the image processing apparatus of FIG. 5.

The timing signal generator 20 is similar to the timing signal generator 2, except for an output of the dispersion cycle signal D-SYNC. That is, the dispersion cycle signal D-SYNC is output from the frequency dispersion circuit 21, as shown in FIG. 6, so as to be used by the noise corrector 5. The noise corrector 5 corrects noise produced in an image due to the timing signals based on the frequency-dispersed clock signals.

In addition, the noise corrector 5 receives the digital image signal output from the A/D converter 4 and performs noise correction based on the timing signal generated by the timing signal generator 2. After the noise correction, the digital image processor 6 processes the digital image signal based on the timing signal generated by the timing signal generator 2.

As described above, the second background method proposes a countermeasure against noise in the image data produced as side effects of the frequency-dispersed clock signals. However, the second background method requires additional memory for storing data corresponding to noise elements contained in one line to eliminate the noise. Therefore, in the image forming apparatus 200, the noise corrector 5 is arranged and configured to perform noise correction so as to effectively suppress a required increase in memory.

Figure 7:
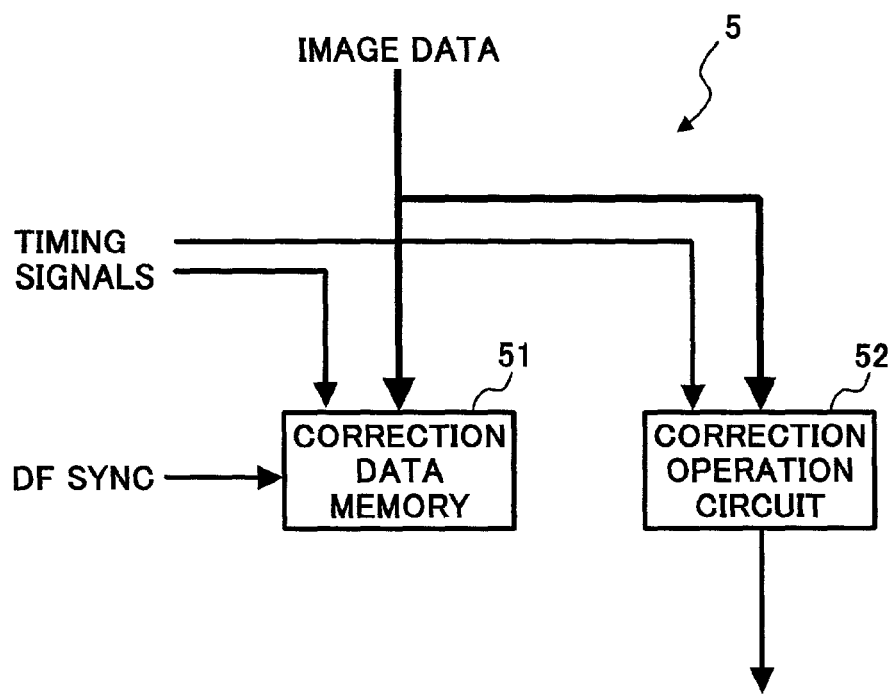
FIG. 7 is a schematic block diagram of a noise correction circuit included in the image processing apparatus of FIG. 5.

Next, FIG. 7 shows an exemplary structure of the noise corrector 5. As shown in FIG. 7, the noise corrector 5 includes a correction data memory 51 and a correction operation circuit 52. In the noise corrector 5, the digital image signal sent from the A/D converter 5 is input to both of the correction data memory 51 and the correction operation circuit 52. The correction data memory 51 reads and manipulates input image data to generate correction data, and stores the correction data generated. The correction operation circuit 52 reads the input image data with reference to the correction data previously stored in the correction data memory 51.

In a procedure of the correction data generation by the correction data memory 51, the input image data that includes noise produced due to frequency dispersion is stored in the correction data memory 51. The noise produced due to the frequency dispersion is extractable, that is, the input image data is the data obtained so the CCD sensor of the scanner reads an even amount of light in the effective image area.

Figure 8:
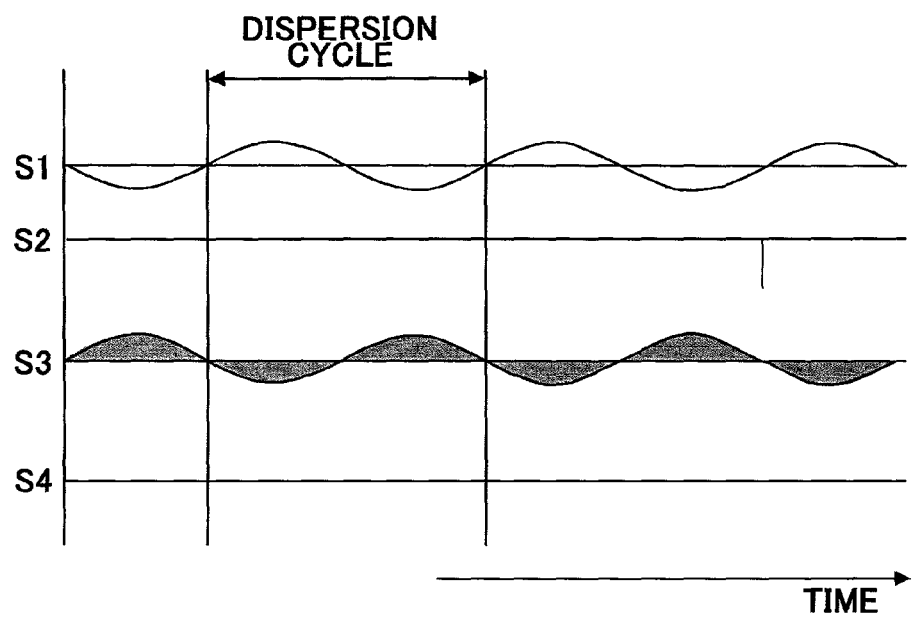
FIG. 8 is a time chart for explaining how an input image signal becomes a clean even output signal.

FIG. 8 shows various exemplary signals in which S1 represents an input image signal, S2 represents the dispersion cycle signal D-SYNC, S3 represents a correction parameter signal, and S4 represents an output signal. When the frequency-dispersed clock signal is not applied, the input image data made by reading an even light amount is basically even data in a digital form. However, in this discussion, the input image data is the one represented by the input image signal S1, for example, because the frequency dispersion is applied to the input. As shown in FIG. 8, the input image signal S1 is the signal that has an even level with no dispersion and to which a noise signal that increases and decreases in a frequency-dispersed cycle is added.

The noise signal added to the input image signal S1 is extracted and a correction parameter is generated. More specifically, the correction data memory 51 reads data of the input image signal S1 for one cycle of the dispersion cycle signal D-SYNC and temporarily stores the read data as correction data with reference to the dispersion cycle signal D-SYNC. Then, the correction operation circuit 52 performs calculations to generate parameters for making the input image signal S1 into even data with the correction data temporarily stored in the correction data memory 51.

By the calculations, the correction operation circuit 52 extracts plus and minus elements of the noise signal with reference to the even level of the input image signal S1 and determines the correction parameter signal S3. The correction parameter signal S3 has a shape in which the extracted noise elements are reversed with reference to the even level, as shown in FIG. 8. Then, the correction operation circuit 52 corrects the input image signal S1 based on the correction parameter signal S3 determined through the calculations. As a result, the correction operation circuit 52 generates the output signal S4 that has no noise and is an even level signal, as shown in FIG. 8.

As described above, the correction operation circuit 52 performs a correction using the correction parameter stored in the correction data memory 51. In this configuration, avoiding a digital delay to perform a high-precision correction is needed. To do this, the image data is synchronized with the dispersion cycle, in which the reference of the correction parameter for one dispersion cycle used for the image data is used for the frequency dispersion, based the dispersion cycle signal D-SYNC. That is, the correction is performed with reference to the dispersion cycle signal D-SYNC and under the condition the synchronization is between the correction parameter and the image data. Thereby, an appropriate correction parameter can be referenced, and as a result, a high-precision correction can be achieved.

In this way, the correction is performed in each dispersion cycle and therefore each correction requires the correction parameter for one dispersion cycle. Accordingly, the correction corrects the noise produced in the image data due to the frequency dispersion using a memory capacity for storing data for at least one dispersion cycle.

Figure 9:
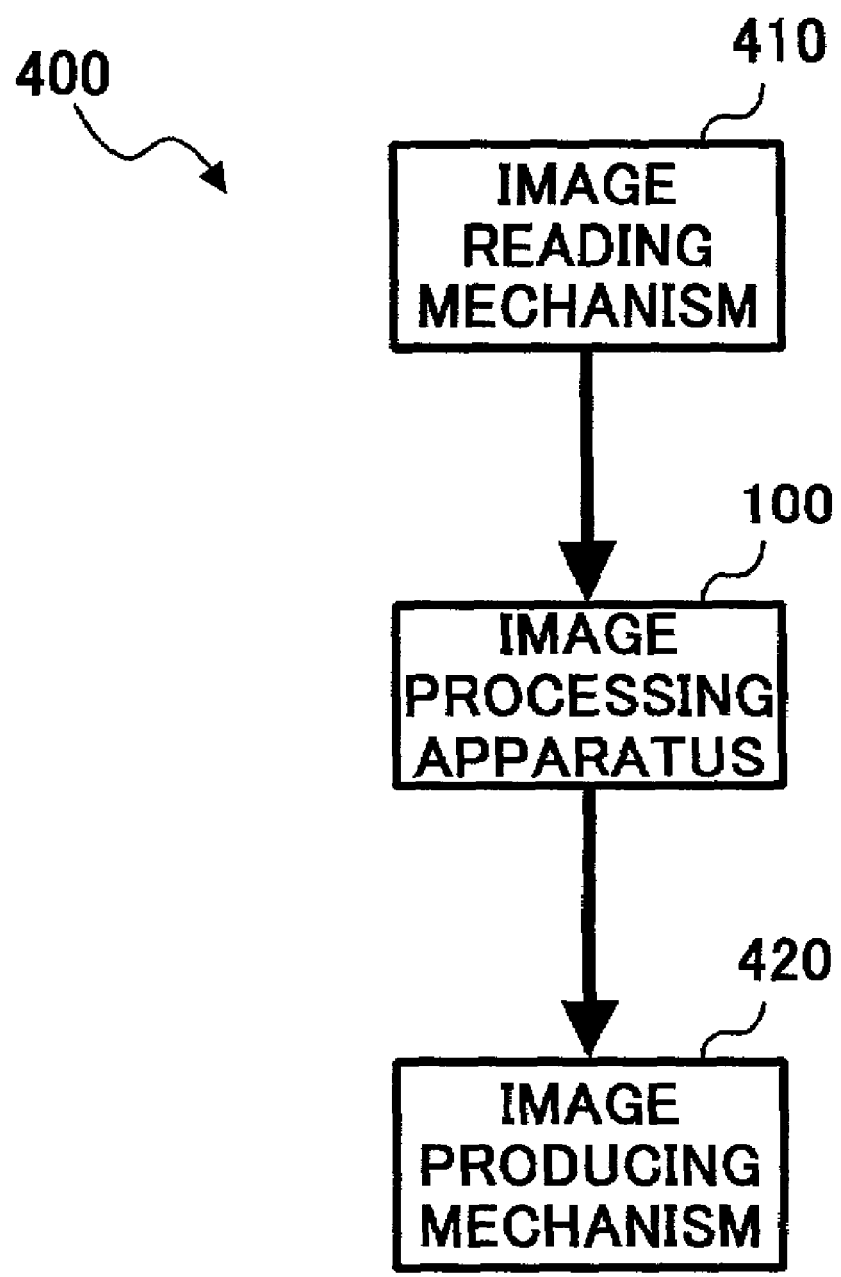
FIG. 9 is a schematic block diagram of an image forming apparatus including the image processing apparatus of FIG. 1.

Turning now to FIG. 9, which shows a block diagram of an image forming apparatus 400 according to a preferred embodiment of the present application. As shown in FIG. 9, the image forming apparatus 400 includes the image processing apparatus 100, an image reading mechanism 410, and an image producing mechanism 420. The image reading mechanism 410 reads an image with a known CCD (charge-coupled device) scanner, for example, and sends an analog image signal to the image processing apparatus 100 which processes and outputs the image data prepared for an image reproduction as described above.

The image producing mechanism 420 receives the image data from the image processing apparatus 100, and forms an image according to a known electrophotographic method, for example. In this way, the image forming apparatus 400 reproduces a quality image.

As an alternative to the image processing apparatus 100, the image processing apparatus 200 can also be used in the image forming apparatus 400 of FIG. 9.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2001-076163 filed on Mar. 16, 2001, in the Japanese Patent Office, the entire contents of which are incorporated by reference herein.

What is claimed is:

1. An image processing apparatus, comprising:
   an image processing circuit configured to process an image signal as image reproduction data, said image signal being read by a line image sensor;
   a frequency dispersion circuit configured to perform frequency dispersion relative to a reference clock signal by continuously modulating an oscillating frequency of the reference clock signal in a predetermined modulation cycle and to generate a frequency dispersion clock signal; and
   a timing signal generator configured to generate a timing signal that controls an operation of said image processing circuit using the frequency dispersion clock signal generated by said frequency dispersion circuit, said timing signal generator generating the timing signal in synchronism with the predetermined modulation cycle used for the frequency dispersion relative to the reference clock signal.

2. The image processing apparatus as defined in claim 1, wherein said frequency dispersion circuit synchronizes the predetermined modulation cycle used for the frequency dispersion relative to the reference clock signal with a line cycle of the line image sensor.

3. The image processing apparatus as defined in claim 2, wherein a relationship between the predetermined modulation cycle used for the frequency dispersion relative to the reference clock signal and a line cycle of the line image sensor satisfies the following approximate equation:

$$Y = aX,$$

where "X" represents the predetermined modulation cycle, "Y" represents a line cycle of the line image sensor, and "a" is an integer.

4. An image processing apparatus, comprising:
   an image processing circuit configured to process an image signal as image reproduction data, said image signal being read by a line image sensor;
   a frequency dispersion circuit configured to perform a frequency dispersion relative to a reference clock signal by continuously modulating an oscillating frequency of the reference clock signal in a predetermined modulation cycle and to generate a frequency dispersion clock signal;
   a timing signal generator configured to generate a timing signal that controls an operation of said image processing circuit using the frequency dispersion clock signal generated by said frequency dispersion circuit; and
   a noise correction circuit configured to previously obtain correction data for one dispersion cycle, to store the correction data, and to correct for a noise produced relative to an image due to the timing signal using the frequency dispersion clock signal in the predetermined modulation cycle of the frequency dispersion with reference to the stored correction data.

5. The image processing apparatus as defined in claim 4, wherein said noise correction circuit synchronizes said reference to said stored correction data with the predetermined modulation cycle used for the frequency dispersion relative to the reference clock signal.

6. An image processing apparatus, comprising:
   image processing means for processing an image signal as image reproduction data, said image signal being read by a line image sensor;
   frequency dispersing means for performing frequency dispersion relative to a reference clock signal by continuously modulating an oscillating frequency of the reference clock signal in a predetermined modulation cycle and generating a frequency dispersion clock signal; and
   timing signal generating means for generating a timing signal that controls an operation of said image processing means using the frequency dispersion clock signal generated by said frequency dispersing, said timing signal generating means generating the timing signal in synchronism with the predetermined modulation cycle used for the frequency dispersion relative to the reference clock signal.

7. The image processing apparatus as defined in claim 6, wherein said frequency dispersing means synchronizes the predetermined modulation cycle used for the frequency dispersion relative to the reference clock signal with a line cycle of the line image sensor.

8. The image processing apparatus as defined in claim 7, wherein a relationship between the predetermined modulation cycle used for the frequency dispersion relative to the reference clock signal and a line cycle of the line image sensor satisfies the following approximate equation:

$$Y = aX,$$

where "X" represents the predetermined modulation cycle, "Y" represents a line cycle of the line image sensor, and "a" is an integer.

9. An image processing apparatus, comprising:
   image processing means for processing an image signal as image reproduction data, said image signal being read by a line image sensor;
   frequency dispersing means for performing frequency dispersion relative to a reference clock signal by continuously modulating an oscillating frequency of the reference clock signal in a predetermined modulation cycle and generating a frequency dispersion clock signal;
   timing signal generating means for generating a timing signal that controls an operation of said image processing means using the frequency dispersion clock signal generated by the frequency dispersing means; and
   noise correcting means for previously obtaining correction data for one dispersion cycle, for storing said correction data, and for correcting for a noise produced relative to an image due to the timing signal using the frequency dispersion clock signal in the predetermined modulation cycle of the frequency dispersion with reference to the stored correction data.

10. The image processing apparatus as defined in claim 9, wherein said noise correcting means synchronizes said reference to said stored correction data with the predetermined modulation cycle used for the frequency dispersion relative to the reference clock signal.

11. A method of image processing, comprising the steps of:
   processing an image signal as image reproduction data, said image signal being read by a line image sensor;
   performing frequency dispersion relative to a reference clock signal by continuously modulating an oscillating frequency of the reference clock signal in a predetermined modulation cycle;

outputting a frequency dispersion clock signal; and generating a timing signal in synchronism with the predetermined modulation cycle used for the frequency dispersion relative to the reference clock signal, said timing signal controlling operations of said performing and outputting step using the frequency dispersion clock signal generated in said performing step.

12. The method as defined in claim 11, wherein said performing step synchronizes the predetermined modulation cycle used for the frequency dispersion relative to the reference clock signal with a line cycle of the line image sensor.

13. The method as defined in claim 12, wherein a relationship between the predetermined modulation cycle used for the frequency dispersion relative to the reference clock signal and a line cycle of the line image sensor satisfies the following approximate equation:

$$Y \approx aX,$$

where "X" represents the predetermined modulation cycle, "Y" represents a line cycle of the line image sensor, and "a" is an integer.

14. A method of image processing, comprising the steps of:

processing an image signal as image reproduction data, said image signal being read by a line image sensor;

performing frequency dispersion relative to a reference clock signal by continuously modulating an oscillating frequency of the reference clock signal in a predetermined modulation cycle;

outputting a frequency dispersion clock signal;

generating a timing signal that controls an operation of said performing and outputting steps using the frequency dispersion clock signal generated by said performing step;

obtaining previously correction data for one dispersion cycle;

storing said correction data; and correcting a noise produced relative to an image due to said timing signal using said frequency dispersion clock signal in the predetermined modulation cycle of said frequency dispersion with reference to said stored correction data.

15. The method as defined in claim 14, wherein said correcting step synchronizes said reference to said stored correction data with the predetermined modulation cycle used for the frequency dispersion relative to the reference clock signal.

16. An image forming apparatus, comprising:

an image reading mechanism configured to read an image and to generate analog image data;

an image processing mechanism configured to process the analog image data generated by said image reading mechanism and to output digital image data for an image reproduction, said image processing mechanism including:

an image processing circuit configured to process an image signal as image reproduction data, said image signal being read by a line image sensor;

a frequency dispersion circuit configured to perform frequency dispersion relative to a reference clock signal by continuously modulating an oscillating frequency of the reference clock signal in a predetermined modulation cycle and to generate a frequency dispersion clock signal; and a timing signal generator configured to generate a timing signal that controls an operation of said image processing circuit using the frequency dispersion clock signal generated by said frequency dispersion circuit, said timing signal generator generating the timing signal in synchronism with the predetermined modulation cycle used for the frequency dispersion relative to the reference clock signal; and an image reproducing mechanism configured to reproduce said image data for the image reproduction output from said image processing mechanism.

17. The image forming apparatus as defined in claim 16, wherein said frequency dispersion circuit synchronizes the predetermined modulation cycle used for the frequency dispersion relative to the reference clock signal with a line cycle of the line image sensor.

18. The image forming apparatus as defined in claim 17, wherein a relationship between the predetermined modulation cycle used for the frequency dispersion relative to the reference clock signal with a line cycle of the line image sensor satisfies an approximate equation;

$$Y \approx aX,$$

where "X" represents the predetermined modulation cycle, "Y" represents a line cycle of the line image sensor, and "a" is an integer.

19. An image forming apparatus, comprising:

an image reading mechanism configured to read an image and to generate analog image data;

an image processing mechanism configured to process the analog image data and to output digital image data, said image processing mechanism including:

an image processing circuit configured to process an image signal as image reproduction data, said image signal being read by a line image sensor;

a frequency dispersion circuit configured to perform frequency dispersion relative to a reference clock signal by continuously modulating an oscillating frequency of the reference clock signal in a predetermined modulation cycle and to generate a frequency dispersion clock signal;

a timing signal generator configured to generate a timing signal that controls an operation of said image processing circuit using the frequency dispersion clock signal generated by said frequency dispersion circuit; and a noise correction circuit configured to previously obtain correction data for one dispersion cycle, to store the correction data, and to correct for a noise produced relative to an image due to the timing signal using the frequency dispersion clock signal in the predetermined modulation cycle of said frequency dispersion with reference to said stored correction data; and an image reproducing mechanism configured to reproduce said image data for the image reproduction output from said image processing mechanism.

20. An image forming apparatus as defined in claim 19, wherein said noise correction circuit synchronizes said reference to said stored correction data with the predetermined modulation cycle used for the frequency dispersion relative to the reference clock signal.

* * * * *